US006840493B2

(12) United States Patent
York et al.

(10) Patent No.: US 6,840,493 B2
(45) Date of Patent: Jan. 11, 2005

(54) VALVE ACTUATOR (76) Inventors: Lemuel T. York, 117 April Point South, Montgomery, TX (US) 77356; Allan S. Richardson, 54 N. Woody Brook Cir., Spring, TX (US) 77382; Beat Kuttel, 10 Spooner Ridge Ct., Spring, TX (US) 77382

( * ) Notice: Subject to any disclaimer, the term of this patent is extended or adjusted under 35 U.S.C. 154(b) by 0 days.

(21) Appl. No.: 10/114,822

(22) Filed: Apr. 3, 2002

(65) Prior Publication Data

US 2003/0189184 A1 Oct. 9, 2003

(51) Int. Cl.[7] .................. F16K 31/122; F16K 31/54
(52) U.S. Cl. .................................... 251/58; 251/250
(58) Field of Search .................... 251/58, 250

(56) References Cited

U.S. PATENT DOCUMENTS

| 3,806,082 | A |   | 4/1974  | Kellner ................... 251/58      |
|-----------|---|---|---------|----------------------------------------|
| 3,941,348 | A |   | 3/1976  | Mott ....................... 251/58    |
| 3,990,508 | A |   | 11/1976 | Boyadjieff et al. ......... 166/72     |
| 4,018,105 | A |   | 4/1977  | Walker ..................... 74/665    |
| 4,276,502 | A |   | 6/1981  | Elliott .................... 318/565   |
| 4,494,376 | A |   | 1/1985  | Beaufort ................... 60/421    |
| 4,535,852 | A |   | 8/1985  | Boyadjieff et al. ......... 175/170    |
| 4,650,153 | A | * | 3/1987  | Winegeart .................. 251/58    |
| 4,753,300 | A |   | 6/1988  | Shaw et al. ............... 173/164    |
| 4,779,844 | A |   | 10/1988 | Mitchell ................... 254/323   |
| 5,325,888 | A |   | 7/1994  | Stary ...................... 137/553   |
| 5,507,467 | A | * | 4/1996  | Mott ........................ 251/58   |
| 5,890,698 | A |   | 4/1999  | Domytrak .................. 251/1.1    |
| 5,979,865 | A |   | 11/1999 | Rabby ...................... 251/62    |

OTHER PUBLICATIONS

Varco Drilling Systems, IBOP Valves & IBOP Actuator Assembly.
Replacement Kellyguard.
International Search Report for International Application No. PCT/US03/09859.

* cited by examiner

Primary Examiner—Eric Keasel
(74) Attorney, Agent, or Firm—Baker Botts L.L.P.

(57) ABSTRACT

A valve actuator is provided in which a complementary set of pinions, each driven by a pair of racks, are located on opposite sides of the valve to be actuated. The racks are part of an annular bearing assembly and are coupled to one another through a hydraulic cylinder or some other displacement device. A pinion retaining sleeve is provided to shield the racks and pinions and prevents parts of the valve actuator from being thrown in operation. The piston retaining sleeve may include a maintenance aperture for installing or repairing a pinion and a second aperture for viewing the rotation of the pinion. The bearing assemblies each include a bearing housing and a bearing retainer that cooperate to shield the bearing assembly.

3 Claims, 7 Drawing Sheets

VALVE ACTUATOR

BACKGROUND OF THE INVENTION

A portable top drive drilling unit typically includes a blowout preventer and a valve or a plurality of valves near the bottom of the top drive on the main shaft of the drill string. The blowout preventer and the valves at of the top drive drilling unit are necessary to manage the flow of fluid from the well through the drill pipe, especially in the case of an unexpected or uncontrolled flow of fluid from the well through the drill pipe. It is common to include two valves, one of which is manually controlled, the other being remotely controlled. The valves themselves may be one-quarter turn floating ball valves, and each will include a valve actuator.

Because the blowout prevention valves in a top drive drilling environment may be rotating and moving along a vertical line up and down the derrick, actuation of these valves is difficult simply because the valves are not stationary. For stationary valves, in contrast, a hydraulic actuator coupled to a hydraulic line may be used to open and close the valve. In the case of non-stationary valves, it is difficult to supply hydraulic or electric power to the valve actuator, especially when the valve is both rotating and moving in a vertical direction.

Some remote valve actuator designs that attempt to account for the rotation and vertical movement of the valve involve rotating actuator sleeves. Other designs involve a rotational sleeve that attempts to provide a rotational seal. These designs, however, introduce excessive mechanical wear in the actuator, and are often unreliable as a result. In the case of the rotational seal, the quality of the rotational seals is often poor because of the rotation and the speed of the rotation. Many of the remote actuators are controlled by air pressure. The introduction of dirty or contaminated air in the vicinity of the drilling rig can introduce contaminates into the actuator, thereby causing the internal mechanisms of the actuator to deteriorate. In cold climates the introduction of air into the actuator can lead to condensation in the actuator. In addition, the inclusion of an actuator that is controlled by air pressure is often an inefficient design choice when many, if not all, of the others devices on the drilling rigs are driven by hydraulic power. Hydraulic actuators have similar difficulties, especially in climates other than cold climates.

Many remote-actuated valves are single crank valves in which the ball of the valve is closed with a quarter turn of the crank. In contrast, many remote-actuated valves have dual cranks to accommodate the forces on the ball valve. Dual crank valves have greater torque capability as compared with single crank valves, which may have limited torque capability because of the presence of only a single crank and the space constraints of the valve itself. Many remote actuated valves are single crank valves that introduce a side load into the crank. Because single crank actuators often introduce a smaller amount of torque into the crank, the ball of the ball valve is sometimes not fully opened or closed as a result of turning the crank. If the ball of the ball valve is not fully closed, fluid that seeps through the partially closed valve may harm the components of the valve or actuator. If the ball of the ball valve is not fully opened, fluid is not allowed to pass through a fully opened passageway, thereby potentially restricting fluid flow. The problem of ball rotation is exacerbated because valve actuators use start and stop points for mechanical actuator movement that are dependent on mechanical start and stop points on the valve itself. As the valve becomes worn, these stop and start limiters may become worn or may be out of alignment, causing the ball of the valve to be rotated imprecisely.

SUMMARY OF THE INVENTION

In accordance with the present invention, a valve actuator is provided that eliminates or reduces disadvantages or problems associated with prior valve actuators. The valve actuator of the present invention includes a largely symmetrical dual crank design in which a pair of racks drive each pinion. Each rack is part of bearing assembly, the elements of which are shielded by a cooperating bearing housing and bearing retainer. The pinions and racks are themselves shielded by a shielded plate that protects the racks and pinions from foreign objects and prevents the pinion from being thrown from the valve actuator. The two bearing assemblies of the valve actuator are coupled to one another through a hydraulic or pneumatic cylinder, which when actuated moves the racks relative to one another to rotate the pinion to open or close the valve that is being actuated.

The present invention is advantageous because of the placement and operations of the racks and pinions. Because the pinions are located on opposite sides of the valve actuator, driving the pinions by applying force to the pinions from opposite sides of the valve to be actuated allows for balanced couple actuation and does not introduce substantial side loading effects on the pinion. The valve actuator is also advantageous in that it is able to rotate in a drill string with the valve itself, and therefore need not include rotary seals in an attempt to accommodate rotation of the valve relative to rotation of the valve actuator. The valve actuator of the present invention is also advantageous in that many of the most critical components of the valve actuator are shielded. The racks and pinions are shielded by a pinion retaining shield, and each of the bearing assemblies includes a bearing housing and bearing retainer that cooperate to enclose the bearings of the bearing assemblies. The valve actuator of the present invention also accommodates the manual activation of the valve. A key can be inserted in the hex hole of the pinion. Rotation of the pinion causes the racks to move relative to the pinion, opening or closing the valve.

Other technical advantages of the present invention will be readily apparent to one skilled in the art from the following figures, descriptions, and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The valve actuator of the present invention is a mechanical actuator that does not include rotary seals. The actuator of the present invention includes a dual crank design, which allows a balanced couple activation to be used to turn the crank of the valve without a side load. The bearings of the valve actuator are enclosed, which protects the bearings from excessive wear and jamming, and the valve actuator may be adapted for use with valves of various manufacturers.

Figure 1A:
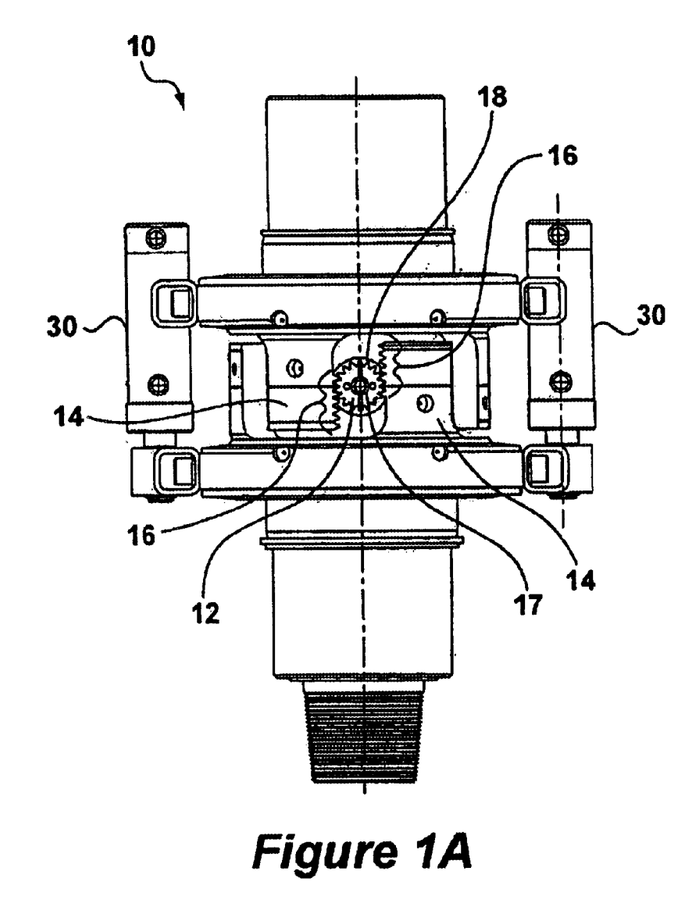
FIG. 1A is a side view of the valve actuator of the present invention in the open position.
Figure 1B:
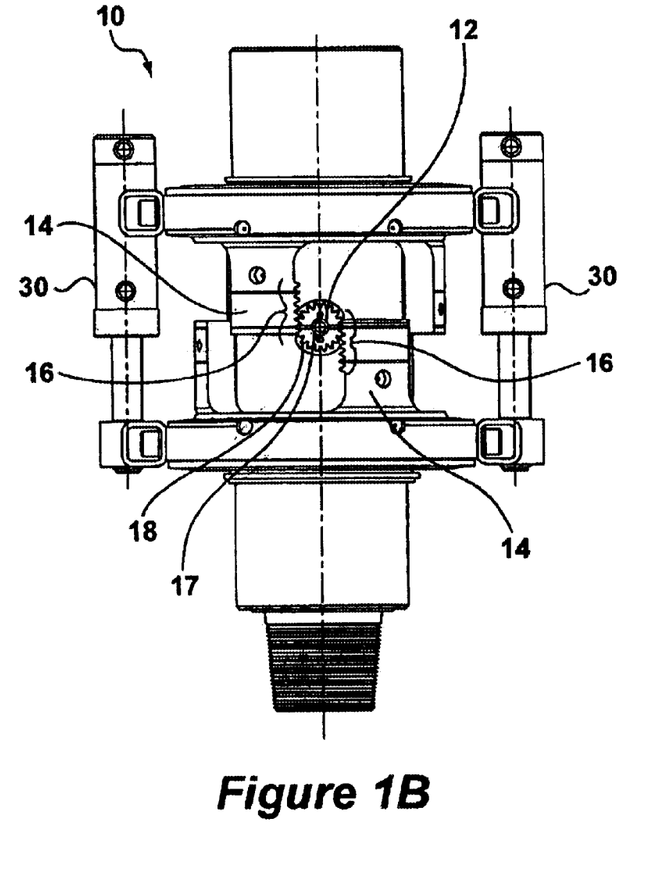
FIG. 1B is a side view of the valve actuator in the closed position.
Figure 1C:
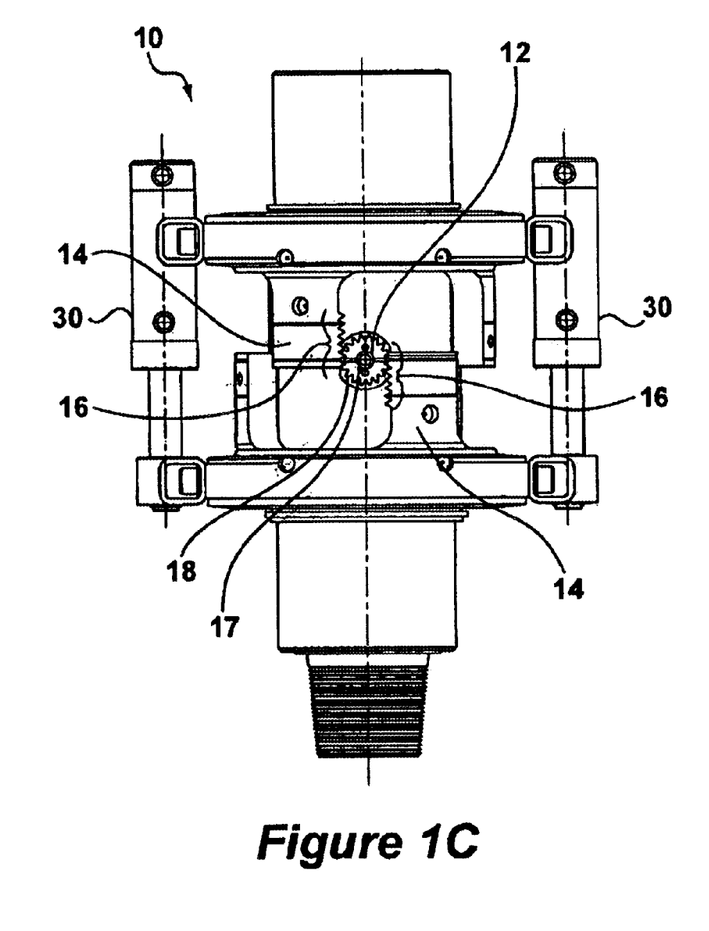
FIG. 1C is a side view of the opposite side of the valve actuator of FIG. 1B.

Shown in FIGS. 1A and 1B are side views of the valve actuator of the present invention, which is indicated generally at 10. Valve actuator 10 is coupled around the exterior of valve 11. Valve 11 is generally cylindrical in shape and includes an elongated body 13. To open or close the valve that is located with the housing of valve actuator 10, a hex key (shown in FIG. 4) must be inserted in the hex key holes 12 in each side of the valve actuator 10. By placing a hex key in the hex key hole 12 in each side of valve actuator 10, the hex keys also penetrate the ball valve of valve 11. Included in an inner sleeve 14 of valve actuator 10 are cooperating racks 16. The teeth of racks 16 match the teeth of a rotatable pinion 18. A like inner sleeve 14, pair of racks 16, and pinion 18 are located on the opposite side of valve actuator 10 from the side shown in FIGS. 1A and 1B. Valve actuator 10 of FIG. 1A is set such that valve 11 of valve actuator 10 is in an open position. To place the valve of valve actuator 10 in a closed position, inner sleeve 14 is moved outwardly. In so doing, the teeth of racks 16 move along the teeth of pinion 18, causing the hex key located in hex hole 12 to rotate, thereby rotating the ball of valve 11 the quarter-turn necessary to close valve 11. The placement of a pair of racks 16 on opposite sides of pinion 18, together with the placement of a corresponding crank, comprising a pair of oppositely spaced racks 16 and a pinion 18, on an opposite side of actuator 10 reduces or eliminates the side loading effects of closing valve 11 and allows for balanced couple actuation of the pinions and valve. Because of the structure of actuator 10, the loading forces are passed to the ball of valve 11 and are not partially absorbed by the racks and pinions of valve actuator 10, resulting in a higher cranking force achievable by valve actuator 10. A view of the opposite side of the valve 10 of FIG. 1B is shown in FIG. 1C. As described above with reference to FIGS. 1A and 1B, FIG. 1C includes a like inner sleeve 14, pair of racks 16, and pinion 18.

Figure 2:
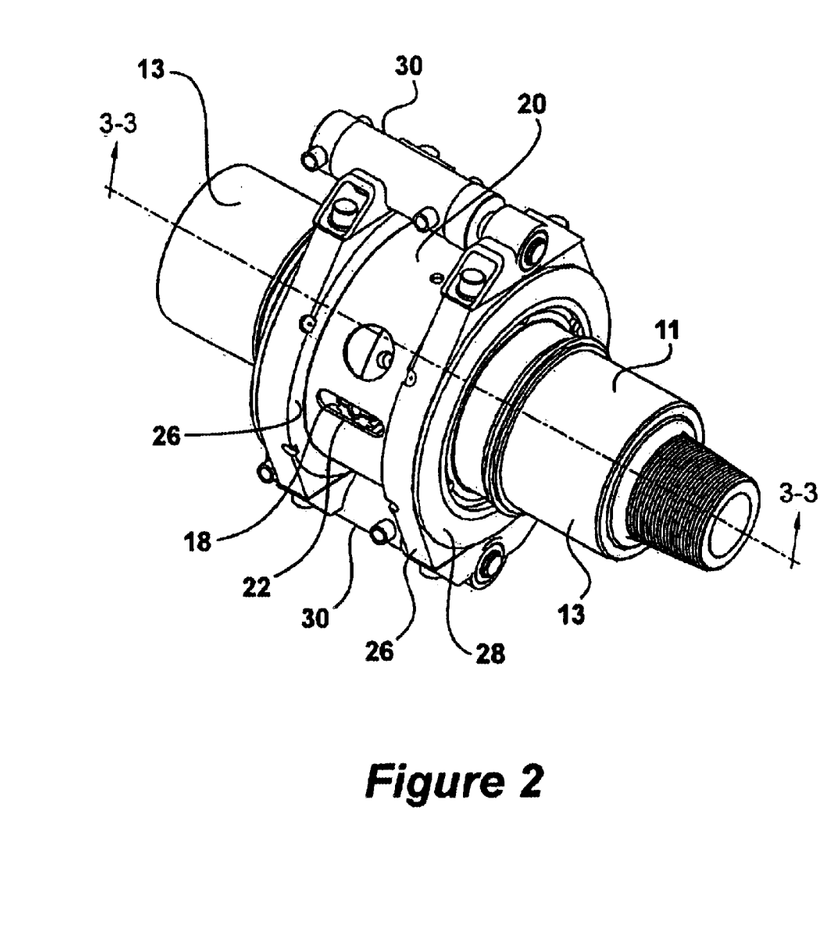
FIG. 2 is an isometric view of the valve actuator.

An isometric view of valve actuator 10 and valve 11 is shown in FIG. 2. In the valve actuator of FIG. 2, hex key hole 12, inner sleeve 14, racks 16, and pinion 18 are shrouded behind a pinion retaining sleeve 20, which includes a view aperture 22 and an installation aperture 24. Pinion 18 includes marks of circles or straight lines to assist in viewing the rotation of the pinion, and this rotation can be viewed through view aperture 22. Installation aperture 24, which is slightly larger than pinion 18 is used for the installation or removal of pinion 18. Pinion retaining sleeves protect the pinion and other components that contribute to the rotation of the pinion from external damage. As valve actuator 10 rotates with the valve, the pinion itself may be dislodged by the rotational force. The pinion retain retaining sleeve prevents the pinion from being thrown far from the valve and allows, through installation aperture 24 for the reinstallation or replacement of the thrown pinion.

Each side of valve actuator 10 includes two bearing assemblies 25, each of which includes bearings, a set of bearing housings 26 and bearing retainers 28. Bearing housing 26 and bearing retainers 28 cooperate to contain and shield the bearings of each of the four racks 16 (not shown in FIG. 2). Bearing housings 26 and bearing retainers 28 overlap with one another to accommodate a labyrinth seal at the bearings of racks 16. At the top and bottom of valve actuator 10, a displacement cylinder, such as a hydraulic or pneumatic cylinder 30 is coupled between the bearing housings 26. As shown in FIGS. 1A and 1B, the cylinder can be extended (FIG. 1B) to cause racks 16 to separate and close valve 11. When cylinder 30 is returned to a contracted position (FIG. 1A), racks 16 move across the teeth of pinion 18 to cause valve 11 to open.

Figure 3:
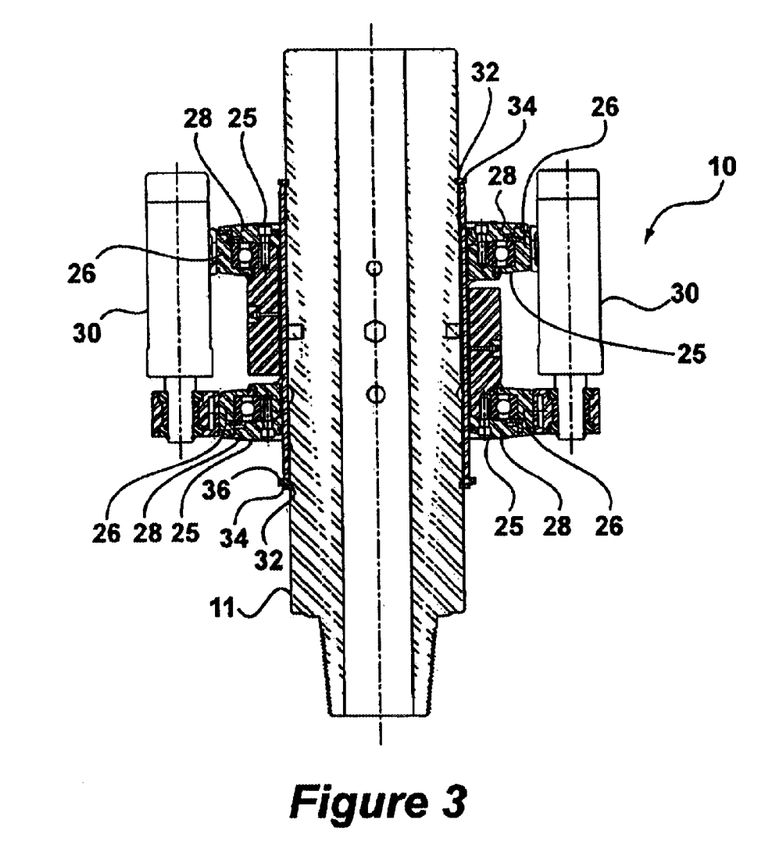
FIG. 3 is a cross sectional view of the valve actuator of FIG. 2 taken along the line 3—3.

Shown in FIG. 3 is a cross-sectional view of valve actuator 10 of FIG. 2 taken along line 3—3. Shown in the valve actuator of FIG. 3 are each of the two bearing housings 26 and cooperation bearing retainers 28, and cylinders 30. As part of valve actuator 10, a pair of grooves 32 are etched into the circumference of valve 11. Inserted in each of the grooves 11 are a pair of snap rings 34. A shoulder 36 may also be inserted along side either or both of the snap rings to assist in securing the actuator in place.

Figure 4:
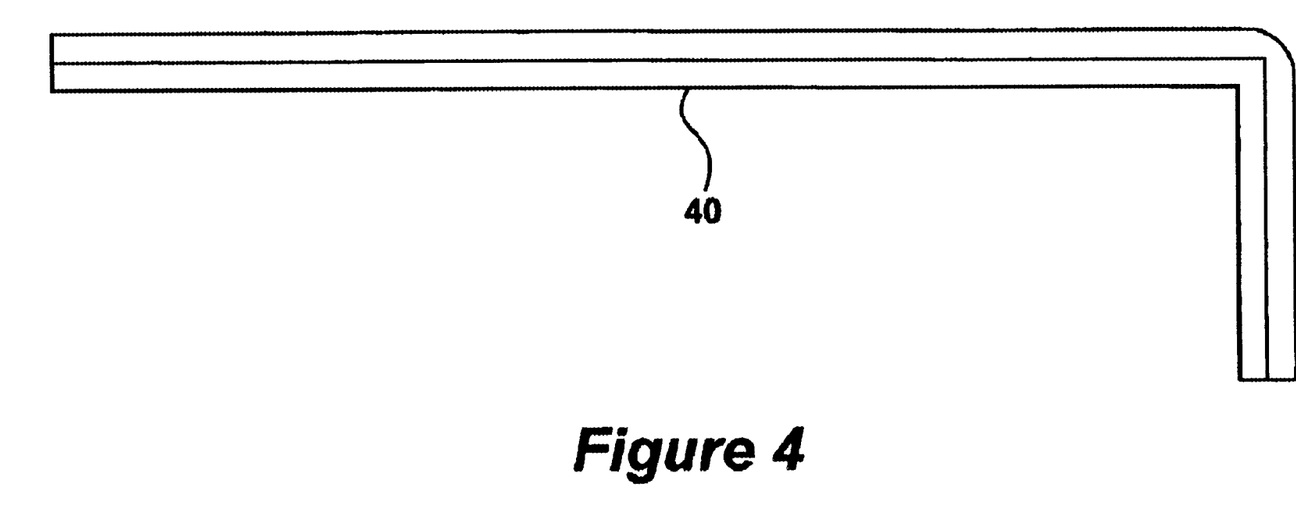
FIG. 4 is a side view of a hex tool.
Figure 5:
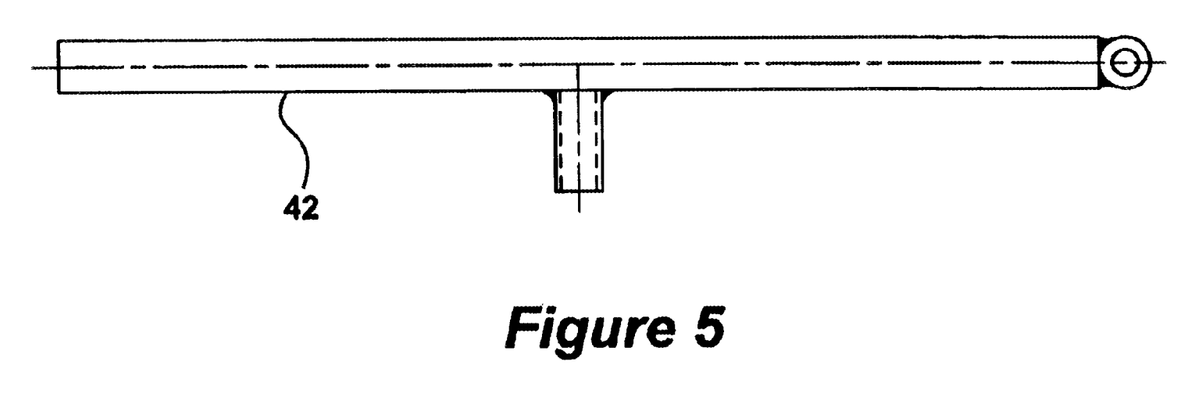
FIG. 5 is a side view of a torque tool.

Valve actuator 10 includes a hex hole or other aperture 17 on pinion 18. To manually activate the movement of pinion 18 and racks 16, a hex or torque tool is inserted in hole 17 and rotated manually. An example of a hex tool 40 is shown in FIG. 4, and an example of a torque tool 42 is shown in FIG. 5. The manual rotation moves pinion 18 and racks 16, manually actuating valve actuator 10 and valve 11. The movement of racks 16 will necessarily result in the expansion or contraction of cylinders 30. Cylinders 30 may be fitted with relief or equalizing valves to release all fluid or air pressure within the cylinders during manual actuation of pinion 18 and racks 16.

The design of the valve actuator disclosed herein permits the valve to be actuated while the valve is being rotated. As such, the actuator rotates with the valve, and, therefore, does not accommodate the valve through a set of rotational seals that do not rotate relative to the valve being actuated. The valve actuator design also includes a set of shielding members, including a pinion retaining shield and a set of cooperating bearing shields that prevent excessive wear or damage to the valve from debris and prevent pieces of the valve from being thrown in the case of a failure or damage to the valve.

Although the present disclosure has been described in detail, it should be understood that various changes, substitutions, and alterations can be made hereto without departing from the spirit and the scope of the invention as defined by the appended claims.

What is claimed is:

1. A valve actuator for opening or closing a valve, comprising:
   first and second pinions, wherein the first pinion is positioned on an opposite side of the valve relative to the position of the second pinion, and wherein each of the first and second pinions includes a crank opening at the axis of the pinion;
   first and second racks positioned to engage the first pinion and rotate the first pinion about its axis, wherein the first and second racks are positioned opposite one another relative to the crank opening of the first pinion;
   third and fourth racks positioned to engage the second pinion and rotate the second pinion about its axis, wherein the third and fourth racks are positioned opposite one another relative to the crank opening of the second pinion;
   a first displacement cylinder having a first end coupled to the first rack and the third rack and a second end coupled to the second rack and the fourth rack;
   a second displacement cylinder having a first end coupled to the first rack and the third rack and a second end coupled to the second rack and the fourth rack, wherein the second displacement cylinder is positioned on an opposite side of the valve relative to the position of the first displacement cylinder;

wherein the first and second displacement cylinders may be actuated, thereby moving the racks along the engagement of each rack with a respective pinion and causing each of the pinions to rotate as a result of the engagement of two respective racks on opposite sides of each of the pinions, whereby each pinion rotates as a result of rotational force applied on opposite sides of each pinion.

2. The valve actuator of claim 1, wherein the first and second displacement cylinders are hydraulic cylinders.

3. The valve actuator of claim 1, wherein the first and second displacement cylinders are pneumatic cylinders.

* * * * *